United States Patent
Fuggmann et al.

(10) Patent No.: US 12,296,894 B2
(45) Date of Patent: May 13, 2025

(54) UNDERCARRIAGE PANELLING ELEMENT FOR A VEHICLE AND ARRANGEMENT OF AN UNDERCARRIAGE PANELLING ON A STRUCTURE OF THE VEHICLE

(71) Applicant: Mercedes-Benz Group AG, Stuttgart (DE)

(72) Inventors: Stefan Fuggmann, Stuttgart (DE); Jochen Schmid, Notzingen (DE); Ralph Manegold, Calw-Stammheim (DE)

(73) Assignee: Mercedes-Benz Group AG, Stuttgart (DE)

(*) Notice: Subject to any disclaimer, the term of this patent is extended or adjusted under 35 U.S.C. 154(b) by 299 days.

(21) Appl. No.: 17/927,273

(22) PCT Filed: May 6, 2021

(86) PCT No.: PCT/EP2021/061941
§ 371 (c)(1),
(2) Date: Nov. 22, 2022

(87) PCT Pub. No.: WO2021/239425
PCT Pub. Date: Dec. 2, 2021

(65) Prior Publication Data
US 2023/0347993 A1    Nov. 2, 2023

(30) Foreign Application Priority Data
May 28, 2020  (DE) .................. 10 2020 003 192.7

(51) Int. Cl.
*B62D 35/02* (2006.01)
(52) U.S. Cl.
CPC .................... *B62D 35/02* (2013.01)

(58) Field of Classification Search
CPC ..... B62D 35/001; B62D 35/007; B62D 35/02
(Continued)

(56) References Cited

U.S. PATENT DOCUMENTS 4,772,060 A * 9/1988 Kretschmer ........... B62D 35/02
                                                    296/180.1
10,040,489 B2 * 8/2018 Baudry .................... D04H 1/55
(Continued)

FOREIGN PATENT DOCUMENTS

DE          201 16 286 U1    1/2002
DE    10 2009 022 684 A1   12/2010
(Continued)

OTHER PUBLICATIONS

English translation of FR 3 093 066; retrieved via PatentTranslate located at www.epo.org. (Year: 2024).*
(Continued)

*Primary Examiner* — Jason S Daniels
(74) *Attorney, Agent, or Firm* — Crowell & Moring LLP

(57) ABSTRACT

An undercarriage panelling element of a vehicle includes a first air guidance region, a second air guidance region that is attached to the first air guidance region rearwards in a longitudinal direction of the vehicle and angled away from the first air guidance region, and a flow separation edge that is attached to the second air guidance region. The flow separation edge is disposed behind the second air guidance region in the longitudinal direction of the vehicle and extends downwards away from the second air guidance region over its entire extension running in a vertical direction of the vehicle in parallel or obliquely to the vertical direction of the vehicle, A rear axle of the vehicle on which wheels are mounted is disposed behind the undercarriage panelling element in the longitudinal direction of the vehicle.

6 Claims, 1 Drawing Sheet

(58) Field of Classification Search
USPC .......................................... 296/180.1, 180.2
See application file for complete search history.

(56) References Cited

U.S. PATENT DOCUMENTS

| | | | |
|---|---|---|---|
| 10,040,493 B2 * | 8/2018 | Wolf | F15D 1/007 |
| 10,137,946 B2 * | 11/2018 | Schoen | B62D 35/02 |
| 10,246,136 B2 * | 4/2019 | Scholz | B62D 35/02 |
| 2011/0309652 A1 | 12/2011 | Eichentopf et al. | |
| 2015/0008689 A1 * | 1/2015 | Shin | H01L 21/6838 |
| | | | 294/183 |

FOREIGN PATENT DOCUMENTS

| | | |
|---|---|---|
| DE | 10 2010 053 463 A1 | 6/2012 |
| DE | 10 2013 105 842 A1 | 12/2014 |
| DE | 10 2013 219 549 A1 | 4/2015 |
| DE | 10 2018 000 922 A1 | 8/2018 |
| DE | 20 2018 104 838 U1 | 10/2018 |
| DE | 10 2017 005 773 A1 | 12/2018 |
| EP | 2 435 288 B1 | 4/2012 |
| FR | 3093066 A1 * | 8/2020 ........... B60G 21/051 |

OTHER PUBLICATIONS

English translation of DE 201 16 286; retrieved via PatentTranslate located at www.epo.org. (Year: 2024).*
PCT/EP2021/061941, International Search Report dated Sep. 16, 2021 (Two (2) pages).
German-language German Office Action issued in German application No. 10 2020 003 192.7 dated Jan. 14, 2021 (Eight (8) pages).
German-language German Office Action issued in German application No. 10 2020 003 192.7 dated Jul. 27, 2022 (Seven (7) pages).

* cited by examiner

UNDERCARRIAGE PANELLING ELEMENT FOR A VEHICLE AND ARRANGEMENT OF AN UNDERCARRIAGE PANELLING ON A STRUCTURE OF THE VEHICLE

BACKGROUND AND SUMMARY OF THE INVENTION

The invention relates to an undercarriage panelling element for a vehicle. The invention further relates to an arrangement of an undercarriage panelling on a structure of a vehicle.

DE 10 2013 219 549 A1 discloses a cover element for an undercarriage panelling for at least partially covering an undercarriage of a motor vehicle. The cover element has at least one first region and at least one elastically deformable second region that is attached to the first region and softer in comparison with the first region. A panelling for an undercarriage of a motor vehicle is further known from DE 201 16 286 U1. Furthermore, a vehicle having a fan nozzle is known from EP 2 435 288 B1.

An undercarriage panelling for a passenger motor vehicle that comprises a plate-shaped undercarriage panelling element for covering an undercarriage of the passenger motor vehicle downwards in the vertical direction of the vehicle results from DE 10 2018 000 922 A1. A reshaping device is further provided, by means of which the undercarriage panelling element can be reshaped into several convex forms that are different from each other, of which the respective lowest part in the vertical direction of the vehicle can be shifted in the longitudinal direction of the vehicle by means of the reshaping device, wherein the respective convex form forms a venturi nozzle with a horizontal roadway, by means of which the downforce or lift is influenced in a targeted manner.

A vehicle having a diffuser in the rear region of its undercarriage, which has a fixed front diffuser part of the undercarriage and an attached foldable back diffuser part of the undercarriage results from DE 10 2013 105 842 A1. Downforce/lift effects and air resistance effects are correspondingly procured by displacing this diffuser end part from an upward folded position into a downward unfolded position.

A vehicle having an undercarriage part that has a lower outer surface that rises up to a rear end of the vehicle, and having a rear bumper part that has a lower edge that is arranged lower than a rear end edge of the undercarriage part (viewed in the vertical direction of the vehicle), such that a vertical gap is formed between the end edge of the undercarriage part and the lower edge of the rear bumper part, results from DE 10 2017 005 773 A1. An intermediate part is further provided that is arranged between the undercarriage part and the rear bumper part in such a way that the vertical gap is covered by the intermediate part. Finally, a flow separation edge protruding downwards from the intermediate part is provided. The turbulent airflow in the region of the undercarriage part, together with the downwardly inclined vortex in front of an impact wall of the intermediate part, leads to a defined flow separation from the outer vehicle skin.

It is the object of the present invention to create an undercarriage panelling element for a vehicle and an arrangement of an undercarriage panelling on a structure of a vehicle, such that a particularly advantageous aerodynamic of the vehicle can be provided.

A first aspect of the invention relates to an undercarriage panelling element for a vehicle, in particular for a motor vehicle formed as a passenger motor vehicle. The undercarriage panelling element is thus used in the completely produced state of the vehicle to at least partially panel an undercarriage of the vehicle downwards in the vertical direction of the vehicle. The undercarriage is here formed by a structure of the vehicle that is formed for example as a self-supporting body, wherein the undercarriage at least partially, in particular at least mostly or entirely delimits an interior space of the vehicle (also described as a passenger space) downwards in the vertical direction of the vehicle.

The undercarriage panelling element has a first air guidance region and a second air guidance region that is attached to the first air guidance region, in particular directly, in particular rearwards in the installation position of the undercarriage panelling element in the longitudinal direction of the vehicle. The undercarriage panelling element here adopts its installation position in the completely produced state of the vehicle, and thus when the undercarriage panelling element or an undercarriage panelling comprising the undercarriage panelling element is at least indirectly and in particular directly attached to the structure, and is here in particular arranged underneath the undercarriage in the vertical direction of the vehicle. The feature that the second air guidance region is directly attached to the first air guidance region, rearwards in the longitudinal direction of the vehicle, is in particular understood to mean that no further region of the undercarriage panelling element is arranged between the first air guidance region and the second air guidance region in the longitudinal direction of the vehicle. The second air guidance region angled away from the first air guidance region extends away from underneath the front to above the back of the first air guidance region in the longitudinal direction of the vehicle in the installation position of the undercarriage panelling element. This means that the second air guidance region thus has a course opposite to the forward travel direction of the vehicle, and thus rising (when viewed in the direction of the vehicle rear), analogous to a ramp.

The features that the second air guidance region is angled away from the first air guidance region, and here extends away from underneath the front to above the back of the first air guidance region in the longitudinal direction of the vehicle, are in particular understood to mean that a front end of the second air guidance region in the longitudinal direction of the vehicle is arranged further down in the vertical direction of the vehicle than a back end of the second air guidance region in the longitudinal direction of the vehicle. Viewed from front to back in the longitudinal direction of the vehicle, the second air guidance region begins on its front end, on which the first air guidance region ends, for example. The second air guidance region additionally ends on its back end. The feature that the second air guidance region is angled away from the first air guidance region is thus in particular understood to mean that an imagined straight line connecting the front end to the back end, which extends in a plane that is stretched through the longitudinal direction of the vehicle in the vertical direction of the vehicle, extends obliquely to the first air guidance region or obliquely to the longitudinal direction of the vehicle and obliquely to the vertical direction of the vehicle, for example. The back end of the second air guidance region is thus arranged further back in the longitudinal direction of the vehicle than the front end of the second air guidance region.

In order to now be able to provide particularly advantageous aerodynamics of the vehicle, the undercarriage panelling element has a flow separation edge that is attached, in particular directly, to the second air guidance region, and that is arranged behind the second air guidance region or on its end region in the longitudinal direction of the vehicle. As previously described in relation to the first air guidance region and the second air guidance region, the feature that the flow separation edge is directly attached to the second air guidance region can be understood to mean that no further region of the undercarriage panelling element is arranged between the second air guidance region and the flow separation edge in the longitudinal direction of the vehicle.

The flow separation edge preferably extends in the installation position of the undercarriage panelling element downwards away from the second air guidance region over its entire extension running in the vertical direction of the vehicle in parallel or obliquely to the vertical direction of the vehicle. The second air guidance region additionally ends on a free end of the undercarriage panelling element as a whole, which ends on the free end. In other words, the flow separation edge forms the free end of the undercarriage panelling element. The upper end of the flow separation edge in the vertical direction of the vehicle coincides with the back end of the second air guidance region in the longitudinal direction of the vehicle in particular when the flow separation edge is directly connected to the second air guidance region. The lower end of the flow separation edge in the vertical direction of the vehicle is the free end of the undercarriage panelling element, wherein the flow separation edge and the undercarriage panelling element as a whole end on the free end. The flow separation edge here extends in parallel or obliquely to the vertical direction of the vehicle over its entire extension, the latter beginning on the upper end and ending on the lower end. The flow separation edge is thus angled away from the second air guidance region. The flow separation edge is thus a jut of the undercarriage panelling element, pointing downwards in the vertical direction of the vehicle starting from the rear end of the second air guidance region. The jut and its function as a flow separation edge, which is also simply described as a separation edge, is combined with the second air guidance region that is arranged in front of the jut in the longitudinal direction of the vehicle, which represents a ramp-like incline from underneath the front to above the back in the longitudinal direction of the vehicle.

When the vehicle travels forwards, air flows around the vehicle from front to back in the longitudinal direction of the vehicle, wherein air flows along the undercarriage panelling, and thus along the undercarriage panelling element. The air flowing along the undercarriage panelling element can particularly advantageously be directed or guided by means of the air guidance regions as needed, such that especially advantageous aerodynamics of the vehicle can be provided. The undercarriage panelling element in particular causes the air flowing along the undercarriage panelling element, also described as undercarriage flow, to be deviated upwards in the vertical direction of the vehicle by means of the second air guidance region, in particular when the air flows first along the first air guidance region and then along the second air guidance region. This means that the second air guidance region causes the undercarriage flow to deviate upwards in the vertical direction of the vehicle. The undercarriage flow is accelerated by this deviation undercarriage flow upwards, whereupon a flow separation of the undercarriage flow is caused by means of the flow separation edge. In other words, after the undercarriage flow is accelerated upwards by the deviation, the undercarriage flow separates from the undercarriage panelling element as a consequence, such that this separation is caused by means of the flow separation edge.

This is then particularly advantageous if an axle, in particular a rear axle, of the vehicle is attached to the undercarriage panelling element rearwards in the longitudinal direction of the vehicle. Due to the flow separation described, the air can be particularly advantageously directed underneath and past the axle, and, for example, in the direction of a diffuser of the vehicle arranged behind the axle in the longitudinal direction of the vehicle, such that a particularly high amount of air is directed in the direction of the diffuser. The flow separation edge ensures a clearly defined flow separation, such that the air is advantageously directed around the rear axle. If the rear axle is at least partially covered by means of at least one cover, downwards in the vertical direction of the vehicle, then the effect can additionally be provided that the air can advantageously flow over the cover. A lift on the rear axle and the air resistance of the vehicle can thus be kept particularly low, such that the vehicle is particularly energy efficient and can thus be operated in a manner which uses especially little fuel, for example, whereby the $CO_2$ emissions can in particular be kept within a particularly low range. Additionally, a particularly advantageous driving dynamic can be provided. Furthermore, a greater ride height on the axle can be represented by the invention compared to conventional solutions.

The invention proceeds in particular from the knowledge that a region in which a previously mentioned diffuser is arranged on the rear of the vehicle should be flowed over by air as well as possible in order to attain the lowest possible air resistance and advantageous lift values. The previously mentioned axle is a challenge, however, due to blockages in the region of the axle, for which reason some vehicles are provided with covers in this region. The invention now enables a greater amount of air to be directed on or to the diffuser and the air to be better directed around the rear axle compared with conventional solutions.

It is preferably provided that the flow separation edge is formed evenly, in particular over its entire extension, which runs from the upper to the lower end, in order to be able to provide a particularly advantageous and clearly defined flow separation of the undercarriage flow.

In a particularly advantageous embodiment of the invention, the second air guidance region is formed evenly. By this should in particular be understood that the second air guidance region extends at least substantially, in particular completely, in a plane that preferably runs obliquely to the longitudinal direction of the vehicle. The air can thus be particularly advantageously accelerated.

In further embodiments of the invention, it is provided that the second air guidance region is curved upwards or downwards in the vertical direction of the vehicle in order to be able to direct or guide the air particularly advantageously, and consequently provide particularly good aerodynamics of the vehicle. When the undercarriage panelling element is viewed from below, upwards in the vertical direction of the vehicle, the second air guidance region is convexly curved if it is curved downwards in the vertical direction of the vehicle. If the second air guidance region is curved upwards in the vertical direction of the vehicle, however, then the second air guidance region is concavely curved.

A further exemplary embodiment provides that the second air guidance region is directly connected to the first air guidance region. The previously described acceleration of the undercarriage flow can thus be effected particularly well by means of the second air guidance region.

In a further embodiment of the invention, it is provided that the second air guidance region is formed as one part with the first air guidance region and/or the flow separation edge is formed as one part with the second air guidance region in order to be able to avoid unwanted turbulences of the air flowing along the undercarriage panelling element.

The undercarriage panelling element is preferably formed from a plastic, in order to be able to represent particularly advantageous aerodynamics in a particularly space-saving way.

It has finally proved particularly advantageous if the preferably even, first air guidance region runs in a plane stretched through the longitudinal direction of the vehicle and in the transverse direction of the vehicle. When the undercarriage flow transfers from the first air guidance region to the second air guidance region, a particularly advantageous and strong acceleration of the undercarriage flow can thus be provided by means of the second air guidance region, such that the diffuser can be provided with a particularly large amount of air.

A second aspect of the invention relates to an arrangement of an undercarriage panelling on a structure of a vehicle, in particular of a motor vehicle, and most particularly a passenger motor vehicle that is formed as a self-supporting body, for example. The undercarriage panelling is at least indirectly, in particular directly, fixed to the structure in the arrangement. A base of the structure is here at least partially covered downwards in the vertical direction of the vehicle by the undercarriage panelling. The undercarriage panelling here comprises at least one undercarriage panelling element according to the first aspect of the invention, such that the base of the structure is at least substantially or completely capped or covered by the undercarriage panelling element downwards in the vertical direction of the vehicle. Advantages and advantageous embodiments of the first aspect of the invention should be seen as advantages and advantageous embodiments of the second aspect and vice versa.

In further embodiments of the invention, a rear axle of the vehicle is arranged behind the undercarriage panelling element, and thus behind the flow separation edge, in the longitudinal direction of the vehicle.

The check rail is here at least partially covered downwards in the vertical direction of the vehicle by a further panelling element arranged behind the undercarriage panelling element, and thus behind the air separation edge in the vertical direction of the vehicle. The further panelling element is formed separately from the rail and attached to the rail, for example, and can thus be moved with the rail relative to the structure. A particularly advantageous direction of the undercarriage flow, in particular rearwards to the diffuser, can thus be guaranteed.

Finally, it has proved particularly advantageous if the previously mentioned diffuser is arranged behind the axle in the longitudinal direction of the vehicle. Particularly advantageous aerodynamics and particularly advantageous driving dynamics of the vehicle can thus be represented.

Further advantages and details of the invention arise from the following description and with the aid of the drawings.

DETAILED DESCRIPTION OF THE DRAWINGS

Figure 1:
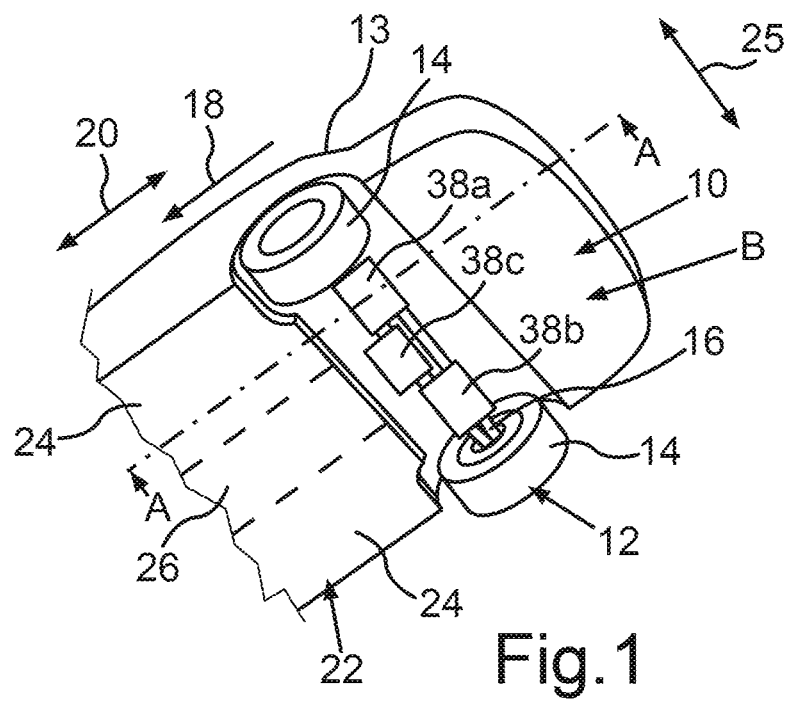
FIG. 1, in part, is a schematic and perspective sub view of a vehicle formed as a passenger motor vehicle, having an undercarriage panelling element that has three air guidance regions arranged one after the other in the longitudinal direction of the vehicle.

FIG. 1 shows the rear region of a vehicle 10 formed as a passenger motor vehicle in part in a schematic and perspectival sub view. The vehicle 10 comprising a structure formed as a self-supporting body 13 has exactly two first and second axles arranged one behind the other in the longitudinal direction of the vehicle, specifically a front axle (not visible in FIG. 1) and a rear axle 12. Two wheels 14 spaced apart from each other in the transverse direction of the vehicle are mounted on this axle, which roll off a roadway 9 in a driving operation.

The rear axle 12 can also comprise axle components in addition to the wheels 14, such as a crossmember that is formed separately from the body 13 and mounted on the body 13, for example. Further components of the rear axle 12 can be check rails, of which a check rail denoted by 16 in FIG. 1 can be partially seen. The wheels 14 are coupled with the body 13 via the check rails in a pivotable manner, for example. The forward travel direction of the vehicle 10 is further visualised in FIG. 1 by an arrow 18. The forward travel direction runs in parallel to the longitudinal direction of the vehicle, however, which is visualised in FIG. 1 by a double arrow 20.

The vehicle 10 further has an undercarriage panelling 22 that is formed separately from the body 13 and is at least indirectly, in particular directly, held on the body 13. The body 13 here has an undercarriage also described as a base, by which the interior of the body 13 or the vehicle 10, also described as a passenger space or passenger cell, is at least partly delimited downwards. The undercarriage panelling 22 is here arranged underneath the base in the vertical direction of the vehicle, such that the base is thus at least partially covered, and thus panelled, downwards in the vertical direction of the vehicle by the undercarriage panelling 22. The undercarriage panelling 22 is arranged in front of the rear axle 12 (viewed in the forward travel direction of the vehicle 10), and so does not cover the rear axle.

In the exemplary embodiment depicted in the figures, the undercarriage panelling 22 extends, at least in its region near or delimiting the rear axle 12, over the entire breadth of the vehicle. The undercarriage panelling 22 can here be formed as one part, i.e., put together from several parts, or in one piece, and thus here comprises at least one undercarriage panelling element 24. In an alternative embodiment variant of the undercarriage panelling 22, the latter has several undercarriage panelling elements 24 that can be arranged next to one another in the transverse direction of the vehicle visualised using a double arrow 26, also described in the vehicle coordinate system as the y direction. A third embodiment variant of the undercarriage panelling 22 is indicated in FIG. 1, in which the vehicle has a central tunnel 26, also described as a tunnel or cardan tunnel, indicated using a dashed line, wherein the undercarriage panelling elements 24 of the undercarriage panelling 22 are arranged next to the central tunnel 26 here.

Figure 2:
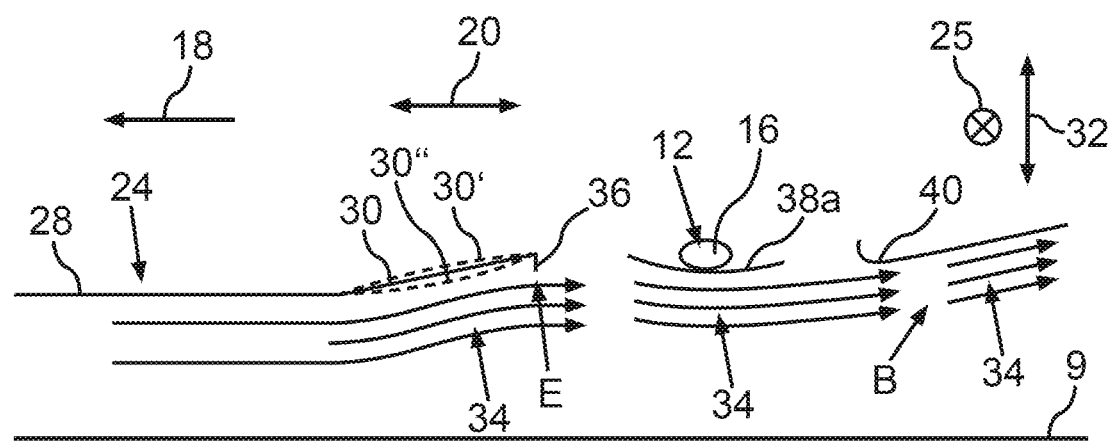
FIG. 2, in part, is a schematic and cut side view of an undercarriage panelling of the vehicle comprising the undercarriage panelling element.

FIG. 2 shows a side view of the vehicle 10 in its undercarriage region along a line of intersection A-A depicted in FIG. 1 in a schematic depiction. It can be seen that the undercarriage panelling element 24 has a first air guidance region 28, which is here formed evenly or substantially evenly, and extends in a plane stretched through the longitudinal direction of the vehicle (x direction in the vehicle coordinate system) and the transverse direction of the vehicle (y direction). The at least one surface of the undercarriage panelling element 24 forming the first air guidance region 28 therefore preferably runs in parallel to the roadway 9.

The undercarriage panelling element 24 also has a second air guidance region that connects directly to the first air guidance region 28 and is angled away from the first air guidance region 28 rearwards in the longitudinal direction of the vehicle, whose first embodiment is marked by 30 and depicted by a solid line in FIG. 2. The second air guidance region 30 is thus formed from at least one even plane that extends away in the installation position of the undercarriage panelling 22, and thus of the undercarriage panelling element 24, from underneath the front to above the back of the first air guidance region 28 in the longitudinal direction of the vehicle. This means that the second air guidance region 30 thus rises in the direction of the rear axle 12 in the form of a ramp. The undercarriage panelling 22, and thus the undercarriage panelling element 24 here take their installation position shown in FIGS. 1 and 2 in the completely constructed state of the vehicle 10. The vertical direction of the vehicle (z direction in the vehicle coordinate system) is visualised in FIG. 2 by a double arrow 32 for a further, even better visualisation of the installation position.

In FIG. 2, arrows 34 visualise air that flows along the undercarriage panelling 22, and thus along the undercarriage panelling element 24, when the vehicle 10 travels forward. The arrows 34 thus visualise an airflow also described as an undercarriage flow that is created when the vehicle 10 travels forwards. The undercarriage flow is here located on an undercarriage panelling 22, and is in particular directed or guided by means of the undercarriage panelling element 24.

In order to now be able to provide particularly advantageous aerodynamics of the vehicle 10, the undercarriage panelling element 24 has a flow separation edge 36 that is directly connected to the second air guidance region 30 or formed around the edges of or protruding from the latter, which is formed in this exemplary embodiment according to FIG. 2 from a border edge or border edge surface angled away or displaced from the second air guidance region 30, the flow separation edge extending downwards away from the second air guidance region 30 over its entire extension running in the vertical direction of the vehicle in parallel or obliquely to the vertical direction of the vehicle depending on the installation position of the undercarriage panelling element 24, and ending on a free end E of the undercarriage panelling element 24. A flow separation of the undercarriage flow of the undercarriage panelling element 24 is effected by means of the flow separation edge 36. A direct impact of the air on the rear axle 12 is thus avoided. Via the airflow separation it is instead ensured that the air does not enter the chamber receiving the rear axle 12 and become caught there, whereby air turbulences would be created which would worsen the aerodynamics of the vehicle in turn. It is thus ensured by means of the embodiment according to the invention of the undercarriage panelling 22 that the undercarriage flow underneath the rear axle 12 is especially advantageously guided over the latter. An acceleration of the undercarriage flow is effected by means of the air guidance region 30 formed in the manner of a ramp rising in relation to the roadway 9 in the direction of the rear axle 12 when the air coming from the air guidance region 28 flows to or over the air guidance region 30. A particularly large amount of air can thus be directed into an area B of the vehicle 10 behind the rear axle 12 in the longitudinal direction of the vehicle. In the exemplary embodiment shown in the figures, a diffuser 40 of the vehicle 10 described as a rear diffuser is arranged in the region B, such that the diffuser 40 is arranged behind the rear axle 12 in the longitudinal direction of the vehicle. The air can thus advantageously flow over the diffuser 40. A particularly large amount of air can additionally be directed to the diffuser 40. Particularly advantageous aerodynamics and particularly advantageous driving dynamics of the vehicle 10 can thus be provided.

The air guidance region 30 is formed evenly in the first embodiment. The air guidance region 30 thus extends in a second plane, which runs obliquely to the longitudinal direction of the vehicle and obliquely to the vertical direction of the vehicle.

A second embodiment of the air guidance region 30 is denoted in FIG. 2 by 30' and visualised by a dashed line. In the second embodiment, the air guidance region 30' is formed by at least one surface curved upwards in the vertical direction of the vehicle, and thus concavely. A third embodiment of the second air guidance region is denoted in FIG. 2 by 30", and visualised by a further dashed line. In the third embodiment, the air guidance region 30" is formed by a surface curved downwards in the vertical direction of the vehicle, and thus convexly. A particularly advantageous direction of the air can thus be provided. Overall, it can be seen that the air guidance region 30, 30', 30" functions and is formed as a ramp running in the longitudinal direction of the vehicle from below the front to above the back, by means of which an acceleration of the air or the undercarriage flow compared with a flow of air along the air guidance region 28 is effected. The diffuser 40 can thus be provided with a particularly large amount of air.

In order to be able to provide particularly advantageous aerodynamics, the rear axle 12 is at least partially covered, and thus panelled by at least one further panelling element of the undercarriage panelling downwards in the vertical direction of the vehicle, by further panelling elements 38a, 38b, 38c in the exemplary embodiment depicted in FIGS. 1 and 2. Here it can be seen from FIG. 2 that the panelling element 38a is curved in the direction of the roadway 9, and thus downwards in the vertical direction of the vehicle. The other panelling elements 38b, 38c can also be formed identically.

As can be seen in FIG. 2, the undercarriage panelling 22 or the at least one undercarriage panelling element 24 and the rear diffuser 40 are arranged spaced apart from each other in the longitudinal direction of the vehicle, wherein the rear axle 12 is arranged in this chamber, which can be panelled downwards by means of at least one panelling element 38, but need not absolutely be panelled. In an exemplary embodiment (not depicted) it is actually provided that no panelling element is arranged between the rear axle 12 and the roadway 9. It can further be seen from FIG. 2 that the first air guidance region 28 or the preferably even wall portion of the undercarriage panelling element 24 that forms this region is arranged lower in the vertical direction of the vehicle 32 than the panelling element 38 of the rear axle 12. It can further be seen that the second air guidance region 30, 30' or 30", or the portion of wall of the undercarriage panelling element 24 that forms this region, is arranged at its end above the panelling element 38 or the wall portion of the panelling element 38 arranged nearest to the roadway 9 (viewed in the vertical direction of the vehicle 32). It can finally be seen that the region or portion of the diffuser 40 arranged neighbouring the rear axle 12 is located at approximately the same height as the panelling element 38, viewed in the vertical direction of the vehicle, wherein the closest wall portion of the diffuser 40 to the roadway 9 is arranged above the flow separation edge 36, viewed in the vertical direction of the vehicle, in this exemplary embodiment.

The following special feature results from the embodiment and arrangement of undercarriage panelling 22, panelling elements 38 and diffuser 40 described above when the airflow is directed underneath the vehicle undercarriage: the air directed along the first air guidance region 28 here runs in parallel or substantially in parallel to the roadway 9. On the second air guidance region 30, the air is directed upwards in the vertical direction of the vehicle, away from the roadway 9 in the direction of or onto the rear axle 12. This upward deviation leads the undercarriage flow to be accelerated by the rear axle, which then finally separates the former from the latter by means of the flow separation edge 36 of the undercarriage panelling element 24. Subsequently, the airflow is guided in an optimised manner in its further course such that it flows over the at least one panelling element 38 of the rear axle 12 particularly conveniently. This reduces the lift on the rear axle and the air resistance of the vehicle, which reduces the emission of $CO_2$ and improves the driving dynamic. This arrangement further allows a greater ride height in front of the rear axle.

It can be seen from FIG. 2 that the course of the air guidance region 30 can be even or concave or convex, entirely or in partial regions. The undercarriage panelling element 24 can have a wall region that projects rearward beyond the flow separation edge 36 in the longitudinal direction of the vehicle, and is here at least partially, in particular substantially or completely arranged above the flow separation edge 36 in the vertical direction of the vehicle, or the flow separation edge 36, as shown in FIG. 2, is the last rearward element in the longitudinal direction of the vehicle or the last region of the undercarriage panelling element 24. The flow separation edge 36 here ends on the free end E, such that the flow separation edge 36 forms the free end E of the undercarriage panelling element 24.

The flow separation edge 36 can extend over the entire breadth of the undercarriage panelling element 24 extending in the transverse direction of the vehicle, or only over a part of the breadth, and/or in several parts of the breadth of the undercarriage panelling element 24 or of the undercarriage panelling 22 spaced apart from each other. The undercarriage panelling 22 can comprise the undercarriage panelling elements 24, which are arranged next to the cardan tunnel and are spaced apart from each other above the cardan tunnel, for example, or the undercarriage panelling 22 extends over at least almost the entire breadth of the undercarriage running in the transverse direction of the vehicle.

The undercarriage panelling element 24 leads the undercarriage flow to be accelerated in front of the rear axle 12 by an upward deviation caused by the air guidance region 30, and then to separate on or from the undercarriage panelling element 24 in a targeted manner, which is caused by the flow separation edge 36. It is thus achieved that a particularly large amount of air is directed in the direction of the diffuser 40, and that this air can then be advantageously guided around and/or under the rear axle 12 via the clearly defined flow separation. The panelling elements 38a to 38c, also described as covers, are advantageously flowed over, whereby the lift on the rear axle 12 and the air resistance of the vehicle 10 can be kept low. An advantageous driving dynamic of the vehicle 10 can thus be provided, and the vehicle 10 can be driven in an energy-efficient manner. The undercarriage panelling 22 also enables a particularly large ride height in front of the rear axle 12.

The invention claimed is:

1. An undercarriage panelling element (24) of a vehicle (10), comprising:
    a first air guidance region (28);
    a second air guidance region (30, 30', 30") that is attached to the first air guidance region (28) rearwards in a longitudinal direction of the vehicle (20) and angled away from the first air guidance region (28) such that the second air guidance region (30, 30', 30") rises relative to the first air guidance region (28) in a vertical direction of the vehicle; and
    a flow separation edge (36) that is attached to the second air guidance region (30, 30', 30"), wherein on the flow separation edge (36) an air flow guided along the second air guidance region (30, 30', 30") comes off in a defined manner when the vehicle (10) is travelling forwards and wherein the flow separation edge (36) is disposed behind the second air guidance region (30, 30', 30") in the longitudinal direction of the vehicle (20) and extends downwards away from the second air guidance region (30, 30', 30") over its entire extension running in the vertical direction of the vehicle in parallel or obliquely to the vertical direction of the vehicle (32) such that the flow separation edge (36) extends downwards away from the second air guidance region (30, 30', 30") in the vertical direction of the vehicle and such that the flow separation edge (36) is a jut of the undercarriage panelling element (24) pointing downwards in the vertical direction of the vehicle starting from a rear end of the second air guidance region (30, 30', 30");
    wherein a rear axle (12) of the vehicle on which wheels (14) are mounted is disposed behind the undercarriage panelling element (24) in the longitudinal direction of the vehicle (20) and wherein the rear axle (12) is at least partially covered downwards in the vertical direction of the vehicle (32) by a further panelling element (38a, 38b, 38c) disposed behind the undercarriage panelling element (24) in the longitudinal direction of the vehicle (20).

2. The undercarriage panelling element (24) according to claim 1, wherein the second air guidance region (30, 30', 30") is directly attached to the first air guidance region (28).

3. The undercarriage panelling element (24) according to claim 1, wherein the second air guidance region (30, 30', 30") is formed in one piece with the first air guidance region (28) and/or with the flow separation edge (36).

4. The undercarriage panelling element (24) according to claim 1, wherein the first air guidance region (28) runs in parallel to a roadway (9).

5. An arrangement, comprising:
    an undercarriage panelling (22) on a structure (13) of a vehicle (10), wherein a base of the structure (13) is at least partially covered downwards in a vertical direction of the vehicle (10) by the undercarriage panelling (22);
    wherein the undercarriage panelling (22) has the undercarriage panelling element (24) according to claim 1.

6. The arrangement according to claim 5, wherein a diffuser (40) of the vehicle (10) is disposed behind the rear axle (12) in the longitudinal direction of the vehicle (20).

* * * * *